(12) United States Patent
Schwotzer (10) Patent No.: US 7,679,723 B2
(45) Date of Patent: Mar. 16, 2010

(54) MEASURING DEVICE AND METHOD THAT OPERATES ACCORDING TO THE BASIC PRINCIPLES OF CONFOCAL MICROSCOPY

(75) Inventor: Axel Schwotzer, Gross-Gerau (DE)

(73) Assignee: Sirona Dental Systems GmbH, Bensheim (DE)

( * ) Notice: Subject to any disclaimer, the term of this patent is extended or adjusted under 35 U.S.C. 154(b) by 345 days.

(21) Appl. No.: 11/792,720

(22) PCT Filed: Dec. 1, 2005

(86) PCT No.: PCT/EP2005/056370
§ 371 (c)(1),
(2), (4) Date: Jun. 11, 2007

(87) PCT Pub. No.: WO2006/061347
PCT Pub. Date: Jun. 15, 2006

(65) Prior Publication Data
US 2007/0296959 A1 Dec. 27, 2007

(30) Foreign Application Priority Data
Dec. 9, 2004 (DE) .................. 10 2004 059 526

(51) Int. Cl.
*G01C 11/12* (2006.01)
*G01N 21/00* (2006.01)
(52) U.S. Cl. ............................. 356/2; 356/73
(58) Field of Classification Search .................. 356/73, 356/445–448, 2
See application file for complete search history.

(56) References Cited

U.S. PATENT DOCUMENTS
4,837,732 A 6/1989 Brandestini et al.
(Continued)

FOREIGN PATENT DOCUMENTS
DE 19837249 2/2000
WO 2005091046 9/2005

OTHER PUBLICATIONS
English Abstract of DE 19837249.

*Primary Examiner*—Michael P Stafira
(74) *Attorney, Agent, or Firm*—Dykema Gossett PLLC (57) ABSTRACT

A scanning system for confocal scanning of an object, comprising a light source (1), imaging optics (4) for focusing the light (5) radiated from the light source (1) onto the object (6) to be scanned, and further comprising an image detector (10) for detecting the light (7) from an object point (6') backscattered from the object (6) and passing through the same imaging optics (4). Means (11) for varying the length of the optical path are disposed in the optical path between the aperture array (3) and the object (6), by which means the optical distance of the image plane can be modified in a specific manner, and means are provided to influence the light (5) radiated by the light source onto the object (6) and/or the light (7) reflected from the object (6) and impinging on the sensor (10), in at least one of its characteristics, during an exposure period ($t_{B1}$) for acquiring an image, and, during said exposure period ($t_{B1}$), a profile holds which states a specific relationship between the characteristic of the light (5, 7) and the optical distance of the image plane from the imaging optics (4), and means (10) are provided which provide a measured value dependent on the characteristics of the light of the trajectory of observation (7) over the exposure period ($t_{B1}$), a height coordinate ($Z_s$) of the object (6) being reconstructable from the measured value achieved during said exposure period ($t_{B1}$) and a reference value.

18 Claims, 5 Drawing Sheets

U.S. PATENT DOCUMENTS

| | | | |
|---|---|---|---|
| 5,978,095 A * | 11/1999 | Tanaami | 356/445 |
| 6,300,618 B1 * | 10/2001 | Tanaami et al. | 250/216 |
| 6,399,942 B1 | 6/2002 | Ishihara | |
| 6,697,164 B1 | 2/2004 | Babaytoff et al. | |
| 2002/0024015 A1 | 2/2002 | Hoffmann et al. | |
| 2002/0167723 A1 | 11/2002 | Eda et al. | |
| 2004/0186382 A1 | 9/2004 | Modell et al. | |
| 2004/0238719 A1 | 12/2004 | Moellmann et al. | |
| 2005/0122577 A1 | 6/2005 | Fujimoto et al. | |
| 2007/0194214 A1 * | 8/2007 | Pfeiffer | 250/216 |

* cited by examiner

MEASURING DEVICE AND METHOD THAT OPERATES ACCORDING TO THE BASIC PRINCIPLES OF CONFOCAL MICROSCOPY

BACKGROUND OF THE INVENTION

The invention relates to a scanning system based on the principle of confocal microscopy. Such scanning systems are used for scanning an object and enable both scanning of a point along an axis (two-dimensional scanning), and scanning of a surface disposed about an axis (three-dimensional scanning). Thus, such a device is suitable for a point sensor and a surface sensor. The invention relates in particular to free-hand intraoral scanning of uncoated teeth with a high degree of accuracy.

DESCRIPTION OF THE PRIOR ART

The basic principles of confocal 3D scanning are known. The determination of the height of a point on an object is achieved, an known from prior art, by determining, for each point of a locking of an aperture array, that position of the object, relative to the imaging optics or relative to the entire scanning device, at which the greatest amount of light beams back through the drilled locking board. In addition, during the movement of the object relative to the imaging optics (or the movement of an optical element in the scanning device), an image frame is recorded for each height resolution step, and for each picture element that frame in the frame sequence is determined in which the intensity is greatest.

From the knowledge of the position of the single frame within the frame sequence, the height profile of the object can be determined. However, typically frame sequences of some 10 to 100 frames must be recorded, so that the measuring procedure, using established recording technologies, takes several seconds or even longer. To shorten the measurement time to one acceptable for intraoral dental imaging, considered to be 0.2 seconds, it is necessary to use extremely complex video technology and data evaluation, or to lose accuracy in at least one of the three dimensions. Moreover, high demands are made on the mechanics for producing the relative motion between the lens and the imaging optics.

WO 00/08415 A1 discloses a method and apparatus in which a pattern of points is projected through the imaging optics onto one or more displaceable focal planes. This measuring process can be accelerated by using different optical components.

In the prior art, it is known that a rapid change in the distance between an object and the imaging optics can be achieved by the insertion of an element made of a medium which has a different optical density, has a variable thickness, and is moved in such a way that the effective thickness is varied over time. A suitable medium for this purpose is glass, for example.

Furthermore, 3-D scanning techniques using an intraoral camera for scanning teeth are also known, which work on the principle of phase shift triangulation. This suffers from the drawback that in order to improve the backscattered radiation it is necessary to coat the teeth.

Moreover, the use of point sensors or line sensors is well known in current 3-D scanning procedures, the 3D-object being moved relatively to the sensor during the measuring operation, which is often referred to as scanning.

Other triangulation procedures are known in which only one image is produced using a flashlamp. The accuracy of a measurement made with such a procedure is low, however, since the entire depth range must be covered by a single image.

It is therefore an object of this invention to provide a scanning method and a scanning system that enables a rapid, but nevertheless accurate, intraoral scanning.

OBJECT OF THE INVENTION

Image digitization of one image frame per height resolution step is replaced with a modulation of the characteristic of the light, eg the intensity or the color of the light, which leads to a correspondingly modulated signal on an image digitizing sensor and thus to a measured value.

The scanning system for confocal measurement of an object comprises a light source, imaging optics for focusing the light emitted from the light source onto the object to be measured, and an image detector to receive the light that is backscattered from the object, passing through the same imaging optics. Furthermore, means are provided to vary the length of the optical path, being located in the optical path between the aperture array and the object, the optical distance of the image plane being variable in a prescribed way and in addition, means are provided to influence, in at least one of its characteristics during the exposure period, the light emitted from the light source and falling onto the object and/or the light backscattered from the object and falling onto the sensor, the relationship between the characteristic of the light and the optical distance of the image plane from the imaging optic following a given profile, and further means are provided that provide a measured value dependent on the characteristics of the light in the beam path of observation during the exposure period, and a height coordinate of the object is reconstructed from this measured value and a given reference value.

Coating the teeth is not necessary, since, even in difficult geometries, the values of intensity are sufficient for analysis, due to the evaluation of the focal point.

It is advantageous to select the influenced characteristic of the light from among the light intensity, its wavelength, and its spectrum. These characteristics are easily detected with CCD-sensors or CMOS-sensors It is advantageous to provide a regulator for the light source for influencing the intensity of the light falling on the object. A conceivable method here would be to regulate the energy supply, for example by changing the voltage and/or the current strength. Light intensities are easily measured and evaluated to a high degree of accuracy with digital image sensors.

It is advantageous to have a sensor present for detecting the characteristic of the light radiated onto the object. It is thus possible to determine the quality of the radiated light and to compensate the deviations due, for example, to wear, or to variations in temperature, current, or voltage.

In particular, the sensor can be a component of the light source, and can, by means of an output signal from the sensor, control and/or regulate the current and/or supply voltage of the light source, to ensure that the light characteristic follows a given profile. Such sensors are known as such, among laser diodes, as monitor diodes for maintaining constant power but are used here for a novel purpose.

It is advantageous for the light that backscatters from the object to be varied by passing it through a means for influencing light characteristics before it reaches the sensor. This makes it possible to illuminate the object with an even, high intensity, which results in a good signal-to-noise ratio.

It is advantageous that the means for influencing the light characteristics have variable transparency. Thus, the light intensity that reaches the sensor can be changed in a simple way.

It is especially advantageous to design the means with variable transparency as an LCD screen. With LCD screens it is possible to control their transparency simply by applying different voltages. Such LCD screens are known in the current state of the art, for example from U.S. Pat. No. 4,837,732.

Alternatively, the means for varying the transparency can take the form of two polarization filters which are variable relative to each other. Such polarization filters are inexpensive to produce, and the transparency control is simple, since the relationship between the relative orientation of the polarization filters to each other and the resulting transparency is continuous.

Another advantageous alternative relates to means that change the chromatic spectrum of the light radiated from the light source and falling onto the object, or of the light radiated back from the object and falling onto the sensor. This makes it possible to keep the lighting intensity constant, which provide a larger signal magnitude and thus a better signal-to-noise ratio.

In one advantageous embodiment of the scanning system, evaluating means are provided for the analysis of acquired image data and for producing scanned data. Furthermore, storage means are provided for storage of the image data and/or the scanned data. In this way immediate analysis and archiving of the scanning results is possible.

It is particularly advantageous when test data are stored in the storage means and the evaluating means have means of comparison which implement such test data for the production and storage of correction data and which can apply the stored correction data to the scanned data. This serves for calibration of the light characteristics and for calibration of the optical system. To effect calibrating, a test piece having precisely defined characteristics can be scanned, and from the test data thus obtained correction data can be derived and stored. This increases the measurement accuracy and can compensate for age-dependent changes in the variation of the light characteristics and/or the sensitivity of the sensor.

It is advantageous to eliminate the influence of the object on the image by using a reference value, which is acquired by creating a reference image and which is compared with the measured value. In addition, means are available for the determination of the reference value on the basis of a second exposure during a second exposure period with a second profile defining the relationship between said light characteristic and said distance.

The reference image maps the individual characteristics of the object, for example differences in the reflectance of the surface or the formation of shadows or penumbrae caused by partial masking of the illumination due to projections on the object which interfere with the scanned data. It is advantageous to create the reference image with the light characteristics held constant, wherein the optical distance of the image plane being varied as during a scanning exposure.

Such a developed planar confocal measurement has the advantage that no longer is one exposure per height resolution step required over the entire depth range, but instead, only two exposures are required, from which a height coordinate and thus a height image can be acquired.

It is particularly advantageous when the means for changing the length of the optical path can scan in different directions for the first and second exposures. The delay between the first and second exposures is minimized in this way.

The invention further relates to a method for confocal scanning of an object, in which the light radiated from a light source and passing through imaging optics is focused onto the object to be scanned, and in which the light from one object point is scattered from the object back through the same optics, to be detected by an image detector. The optical distance of the image plane from the imaging optics is varied in a given way during an exposure period, and the light that is radiated from the light source and/or radiated back from the object onto the sensor during an exposure period is influenced in at least one characteristic, a specific profile establishing the relationship between the characteristic of the light and the optical distance of the image plane from the imaging optics during the exposure period. Furthermore, a measured value dependent on the characteristic of the light in the beam path of observation is determined, and a height coordinate of the object is reconstructed by comparing the measured value obtained during the exposure period with a given reference value.

It is advantageous to determine the reference value by a second exposure during a second exposure period using a second profile relating the characteristics of the light to distance.

In an advantageous development, the characteristic of the light undergoes less variation during is determination of the reference value than during the generation of a scan image.

It is particularly advantageous to keep the characteristic of the light constant during acquisition of the reference value. Then, for the purpose of measuring the object, one exposure without variation of the intensity of the light falling on the object is followed by an exposure with variation of said light intensity on the object.

If the optical path is changed over time in the same way during both exposures, this has the advantage that processing the reference value and the scanned value will be possible without further corrective measures. Thus the height image can be computed pixel by pixel from the two exposures from their intensity ratios.

It is advantageous for the second exposure to occur in a single pass before or after the object is scanned. This makes it possible to produce an analyzable image data set in a single pass.

It is advantageous when the characteristic of the light is detected by a sensor, and the output signal thereof is used to regulate the variation of the light characteristic. In this way particularly high repeatability is possible.

It is advantageous, in the context of a calibration, for the profile to be adapted to local conditions. This allows the effects of wear, for example as the decline in light intensity or the change in the characteristic curve of the installed light source, to be eliminated, and assures a precise analysis, even after long use of the light source. Further inaccuracies of the optical system can be determined by means of a calibration and correction data can be generated, which are applied to scanning data. This improves the accuracy of the scanned data.

BRIEF DESCRIPTION OF THE DRAWINGS

The method of the invention will be explained below with reference to the following drawings, in which.

DESCRIPTION OF EMBODIMENTS OF THE INVENTION

Figure 1:
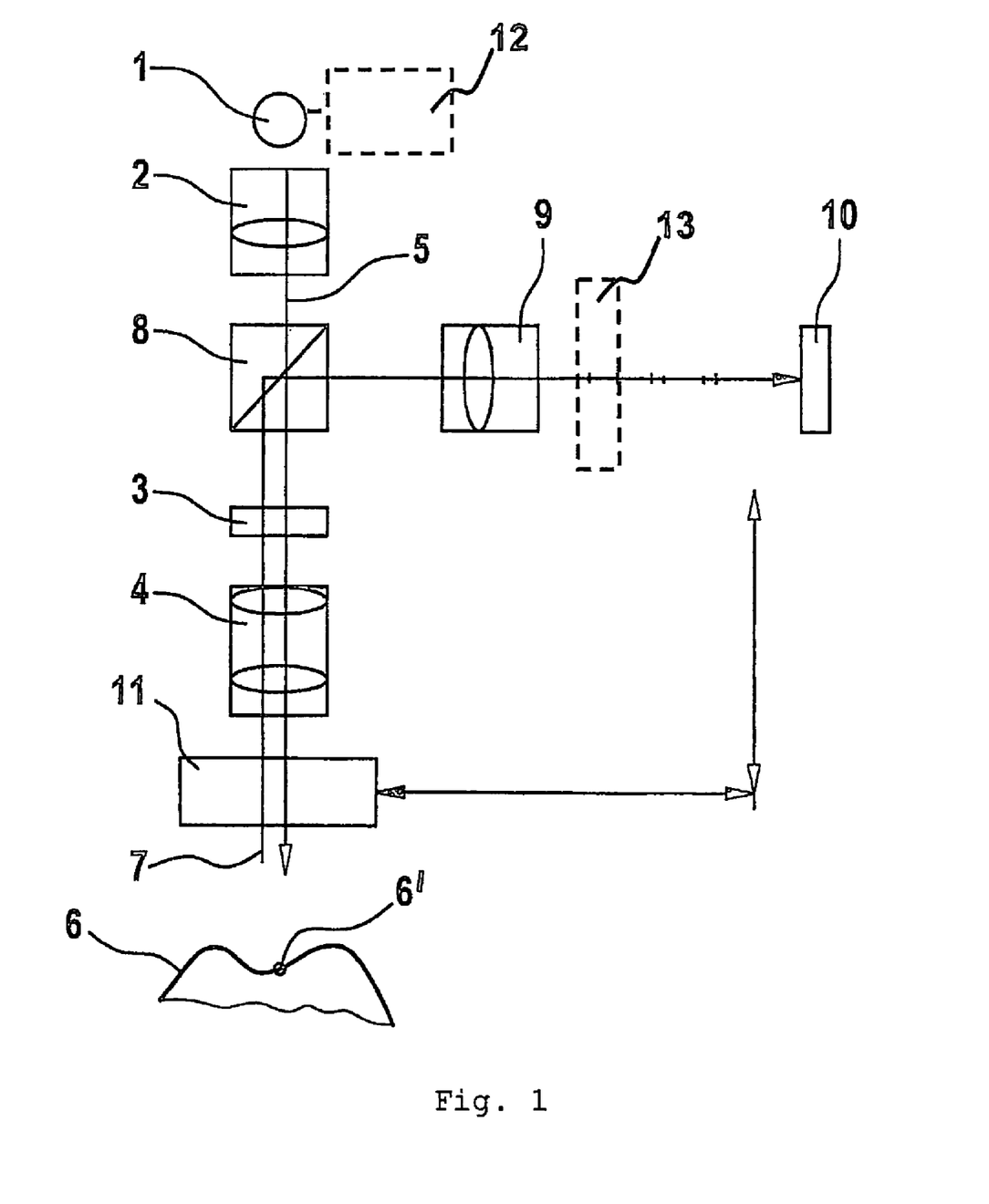
FIG. 1 shows a basic embodiment of the scanning system based on the principle of confocal microscopy.

A confocal scanning apparatus as illustrated in FIG. 1 comprises, for example, a Nipkow Disk or a microlens array, a beam splitter, imaging optics, and means for varying the length of the optical path.

FIG. 1 shows a basic embodiment of the scanning system based on the principle of confocal microscopy. The scanning system comprises a light source 1, which typically radiates monochromatic or white light.

Through an optical system 2, the light source 1 is imaged in an appropriate way on an aperture array 3. The aperture array 3 can be designed as a locking plate with an array of holes, or alternatively, in more advanced applications, an arrangement of microlenses can be used. If necessary, this arrangement may be moved rapidly to achieve full coverage of the object 6, an exposure being necessary at each position.

By means of imaging optics 4, usually designed to be telecentric, the light 5 leaving the aperture array 3 is imaged onto an object 6 to be scanned. The optical distance of the imaging optic relative to the object 6 can be varied, so that different contour lines of the object 6 to be measured lie in the image plane of the imaging optics 4. The points of light generated in this way on object 6 to be scanned will backscatter (or reflect) therefrom and pass through aperture array 3 as a beam path of observation 7, in the reverse direction to that taken by the light 5.

The quantity of backscattered light always reaches a maximum for those object points 6' on object 6 which lie exactly in the image plane of imaging optics 4. In this case the intensity of the light is distinctly greater than in the case of backscattering of light outside the image plane.

The light in the trajectory of observation 7, passing back through aperture array 3 is, by means of a beam splitter 8 and collection optics 9, imaged onto an image detector 10 from which an electronic signal is obtained that is sent to a computer for analysis.

Variation of the optical distance between the imaging optics 4 and object 6 is effected by a device 11 for varying the length of the optical path.

It is neither necessary for a linear relation to exist between the movement of this element and the sharp range in the object physical space nor for a particular contour line in the object to be sharply imaged at the same time, since such behavior can be corrected by appropriate calibration procedures.

A preferred arrangement of such an element as means 11 for changing the length of the optical path in the trajectory between aperture array 3 on the one hand and object 6 on the other hand can consist of two glass wedges, which are displaced relatively to one another so as result a glass plate with a variable thickness is generated.

The effective path length can also be varied by way of a folded optical path and a displaceable reflector. It can be advantageous to drive the reflector with a plunger coil, similar to that used in a loudspeaker.

In addition, means for influencing the illumination are present in the scanning system. For this control devices 12 are provided which cooperate with light source 1. Control device 12 can, for example, consist of a sensor and control electronics that regulate the electric current in the light source. The sensor built into control device 12 measures the momentary illumination intensity and/or the momentary color of the light and passes the measured value on to the control electronics. This compares the observed value with a required value, which, for example, is contained in a profile, and, based on the difference between the two values, regulates the voltage and/or current supplied to the light source.

Alternatively, or in addition, it is possible to design an LCD screen 13 in the optical path between object 6 and image detector 10, which enables variable attenuation over time of the luminous intensity reaching the image detector 10.

Figure 2:
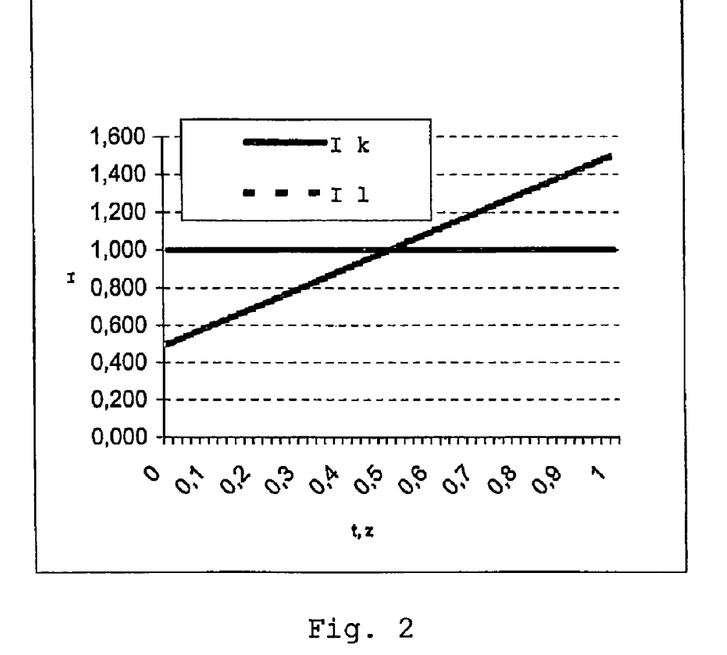
FIG. 2 shows the gradient of the illumination as a function of the exposure time and/or the distance of the focal point from the imaging optics.

The curve of the illumination is shown in FIG. 2, as a function of the exposure period t or of the distance Z of the focal point from the imaging optics. The solid curve $I_k$ represents constant illumination during the total exposure period $t_{B1}$, while the curve $I_l$ represents linear variation of the light intensity during the exposure period $t_{B1}$.

Figure 3:
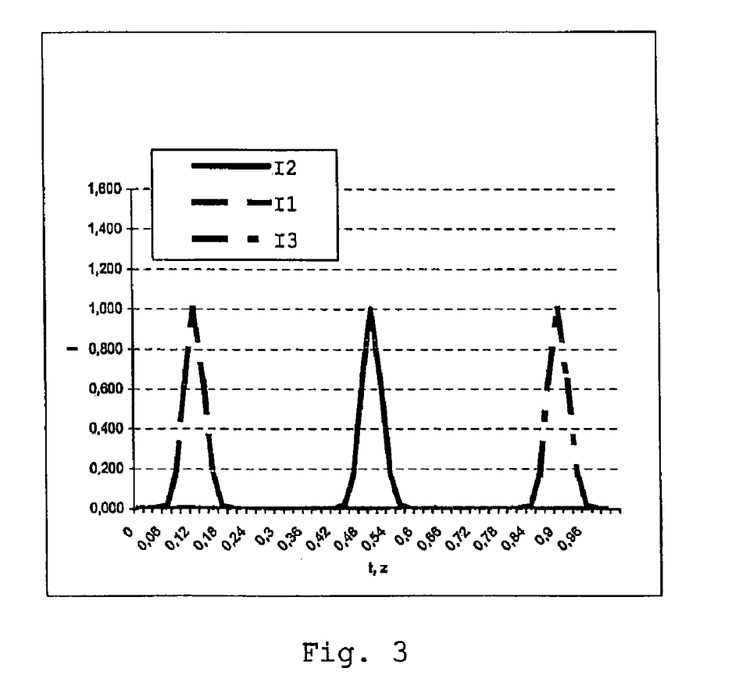
FIG. 3 shows the time dependent intensity curve obtained while varying the focal point over the entire scanning area, with constant illumination, for three different points on the object.

FIG. 3 shows the temporal curve of the intensity on the image detector for three different object points during variation of the focus over the entire measurement range, with constant illumination $I_k$. For the first object point, at time $t_1=0.1\ t_{B1}$, an ideal object yields an intensity value I, which is also yielded by other object points, which are located at a different distance, shown at times $t_2=0.5\ t_{B1}$ and $t_3=0.9\ t_{B1}$.

The object scanned in FIG. 3 has no irregularities whatever, so that the curves are merely shifted while having the same integral value.

In practice, however, the level of intensity depends on the geometry of the object or on a particular backscattering behavior or on inaccuracies in the measuring system, so that the three curve progressions that appear in a real scanning operation will actually differ from each other. Due to the fact that the same conditions form the basis of both exposures, the influence of such conditions on the measured results can be corrected.

Figure 4:
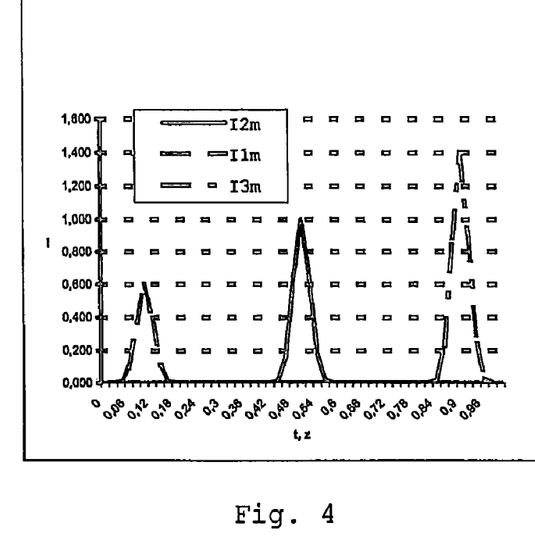
FIG. 4 shows the time dependent intensity curve obtained when focusing over the whole range with variable illumination.

FIG. 4 shows the temporal course of the intensity while focusing over the whole range with variable illumination $I_1$, again based on an ideal object scanned as in FIG. 3.

Due to the different intensity of the illumination during the exposure period $t_{B1}$, the three curves $I_1$, $I_2$, $I_3$ have different characteristics, so that the three integral values $S_1$, $S_2$, $S_3$ at times $t_1$, $t_2$ and $t_3$ respectively differ from one another. In the present case, if $t_1<t_2<t_3$, it also holds that, for the integral values, $S_1<S_2<S_3$. Regarded numerically, curve $I_1$ yields an integral value $S_1$ of 1.595, curve $I_2$ an integral value $S_2$ of 2.658, and curve $I_3$ an integral value $S_3$ of 3.721. This sum is the measuring signal I, integrated on the sensor, from which the object distance Z is determined.

To measure an object, first an exposure is carried out without modulation of, eg the intensity of the light source by regulation of the current, which is followed by an exposure effected with such modulation. During both exposures, the optical path is varied over time t in the same way. The height image is computed pixel by pixel from the intensity ratios of the two exposures.

However, the intensity I of the signal depends not only on focusing but also on the object itself—on its surface condition, the material, the perpendicular to the optical axis, etc. See FIGS. 5 and 6.

Figure 5:
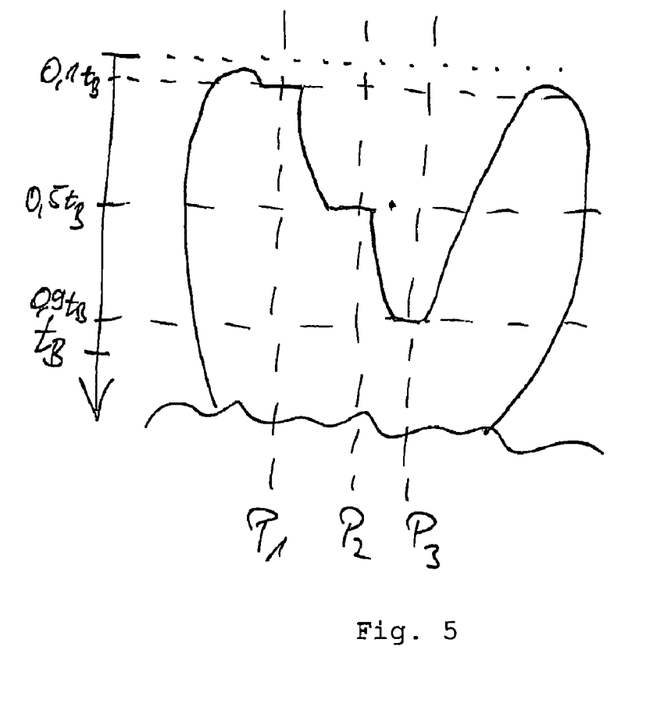
FIG. 5 shows an ideal object for scanning according to FIGS. 3 and 4.
Figure 6:
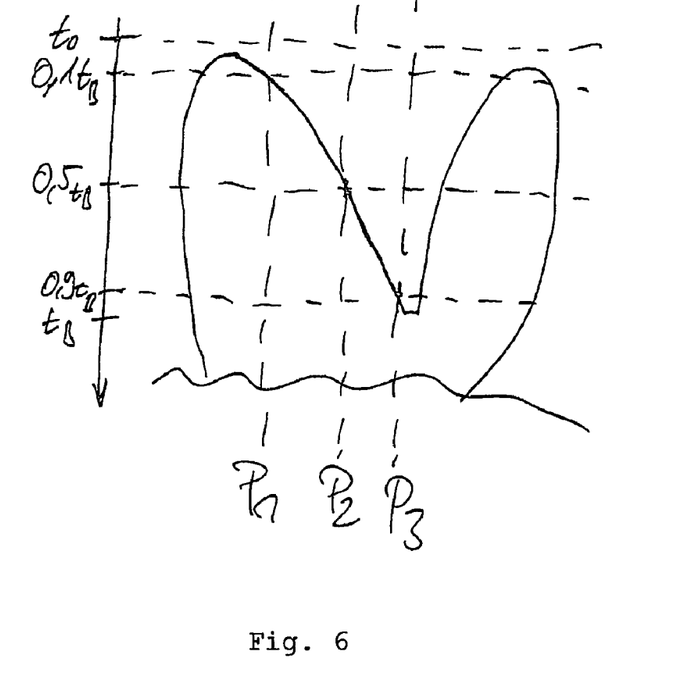
FIG. 6 shows a typical object for scanning according to FIGS. 3 and 4.

In order to eliminate this modulation of intensity from the measurement signal, which should be determined solely by the height of the object, a reference measurement is performed over an exposure period $t_{B2}$. In this reference measurement, the focus is changed in the same way as in the previous or subsequent height measurement, the illumination being held constant, however. This ensures that only the intensity modulation due to object 6 is measured.

By effecting a pixel-wise division of the measuring image by the reference image, there is obtained an image which contains only the height information of the confocal measurement.

For exact analysis, the time-dependence of the illumination during the exposure period $t_{B1}$ must be known. There are several ways of doing this.

In a calibration operation, the dependence of the illumination, eg the light that radiates onto the object, on the time t is measured. This dependence must then always be the same during scanning as in calibration. Accuracy is then commensurate with repeatability.

In the case of a measurement of the illumination during a height measurement, eg with a photodiode, the curve of the relevant light characteristic is known, not only basically but also for the current scanning session. The repeating accuracy of two exposures made in immediate succession determines the accuracy of the present method.

Moreover, when the illumination is regulated during a height measurement, eg using a photodiode as monitor diode, similar to laser diode assemblies, it is possible to set, monitor, and readjust the desired profile.

The exposure period $t_{B2}$ for producing the reference image is just as long as the exposure period for producing the scanned image $t_{B1}$, since focusing is varied in the same way as for the scanned image.

Figure 7:
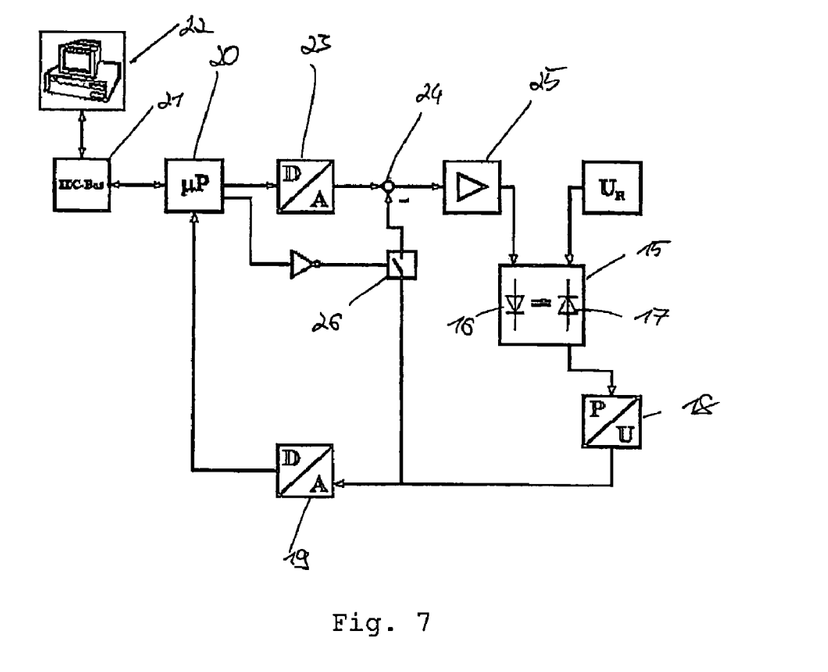
FIG. 7 is a diagrammatic sketch depicting the method of monitoring and/or regulating the light characteristic.

Such regulation is illustrated in FIG. 7. In a diode module 15, in which the laser diode 16 for control of the illumination is located, there is also located a monitor diode 17, such that part of the light emitted by the laser diode 16 falls onto the monitor diode 17. The power output of monitor diode 17 depends on the intensity of the light that is emitted by laser diode 16 and is incident on the monitor diode.

By means of a power meter 18, a voltage dependent on the power output is produced. This voltage is converted in an analog-to-digital converter 19 into a digital signal, which can be processed in a microprocessor 20. The microprocessor 20 can compare the observed value with a desired value, which is either stored in the microprocessor 20 itself, or is fed in via an interface 21 by other equipment, for example a computer 22.

The microprocessor 20 thereby produces a control signal, by means of which the power supply or current supply of the laser diode 16 is regulated via a digital-to-analog converter 23, a comparator 24, and an amplifier 25. The microprocessor 20 can in addition apply the voltage to the comparator corresponding to the power, so that only the difference between the required and observed values is used to regulate the laser diode 16. In addition a switching unit 26 is provided for actuation by the microprocessor 20.

Figure 8:
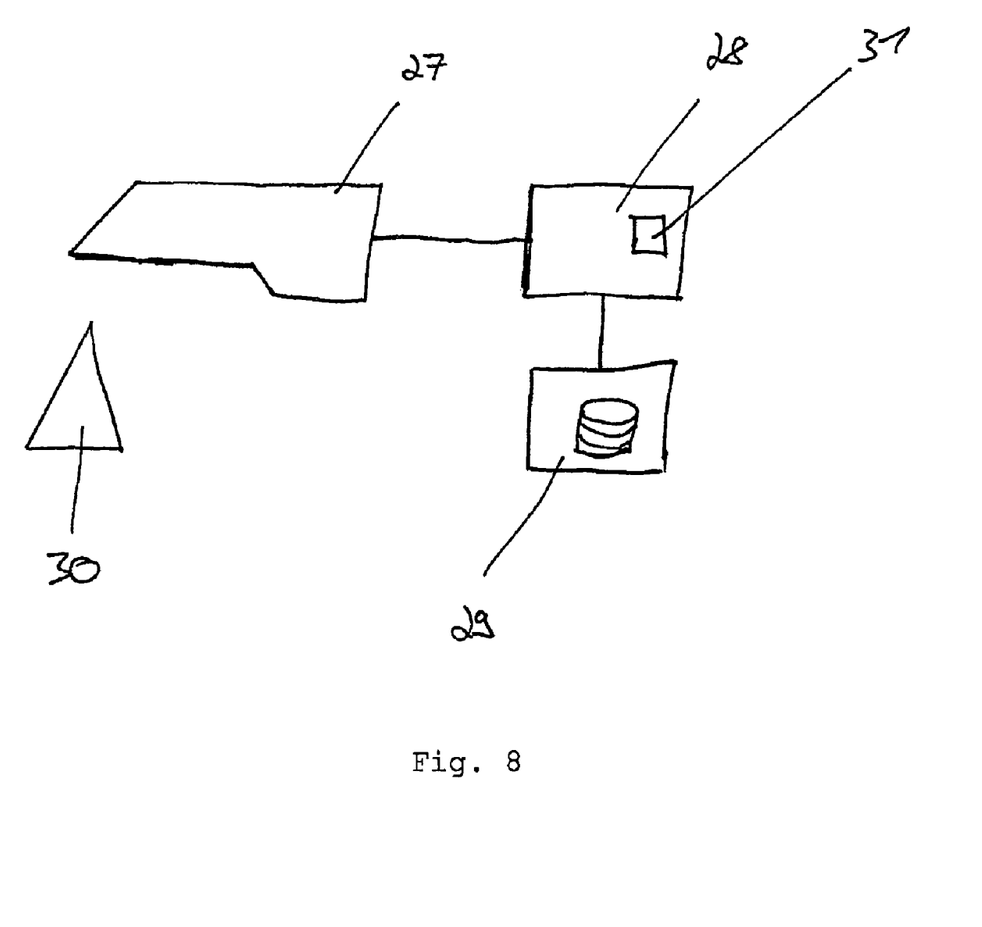
FIG. 8 is a diagrammatic sketch of the scanning system as a unit during calibration of the scanning system.

FIG. 8 illustrates a scanning system 27 as a unit with subsidiary devices. The subsidiary devices consist principally of an evaluation unit 28 and a memory unit 29. In addition, a test piece 30 is shown, whose function will be described below. The evaluating unit 28 has a comparative unit 31, which serves to compare different images. Thus, with the aid of comparative unit 31, the influence of the characteristics of the object 6 can be eliminated from the scanned data so that only the pure height data of the object 6 remain. The evaluating unit 28 and the memory unit 29 can alternatively be integrated in the scanning device 27 or be implemented as a free-standing unit or units.

Furthermore, comparison unit 31 serves for calibration of scanning device 27. For this the test piece 30 is measured in at least one orientation relative to scanning device 27. Comparative unit 31 compares the observed scanned data with the known geometry of test piece 30, from which comparison it can determine, on the one hand, the inaccuracies of the imaging unit and, on the other hand, the relationship of variation of the light characteristic to the height.

LIST OF REFERENCE NUMERALS OR CHARACTERS 1 light source
2 optics
3 aperture array
4 imaging optics
5 radiated light
6 object to be scanned
6' object points
7 beam path of observation
8 beam splitter
9 collecting optics
10 image detector
11 means for varying the length of the optical path
12 control means
13 LCD screen
14 diode module
15 laser diode
16 monitor diode
17 power meter
18 analog-to-digital converter
19 microprocessor
20 computer interface
21 computer
22 analog-to-digital converter
23 comparator
24 amplifier
25 switching unit
26 scanning systems
27 evaluating means
28 storage means
29 test piece
30 comparative means
I level of intensity of the measuring signal
$I_1; I_2; I_3$ levels of intensity of the variable illumination
$I_K$ intensity of the constant illumination
$S_1; S_2; S_3$ integral values
t period of exposure
$t_1; t_2; t_3$ time points
$t_{B1}$ exposure period for making the scanning exposure
$t_{B2}$ exposure period for making reference exposure
z object distance
$z_s$ height coordinate

The invention claimed is:

1. A scanning system for confocal scanning of an object, comprising a light source, imaging optics for focusing light radiated from said light source onto said object to be scanned, further comprising an image detector for detecting light on an object point backscattered from said object and passing through said imaging optics, wherein means for varying a length of an optical path positioned between an aperture array and said object, by which means the optical distance of an image plane can be modified in a specific manner, means for influencing light characteristics of the light radiated by said light source onto said object and/or the light reflected from said object and impinging on a sensor, in at least one of its characteristics, during an exposure period ($t_{B1}$) for acquiring an image, and during said exposure period ($t_{B1}$) a profile holds which states a specific relationship between the characteristic of said light and the optical distance of the image plane from said imaging optics, and means for providing a measured value dependent on the properties of the light of the beam path of observation for the exposure period ($t_{B1}$), a height coordinate ($Z_s$) of said object being reconstructable from the measured value achieved during said exposure period ($t_{B1}$) and a reference value, and means for determining a comparative value on the basis of a second image acquired in a second exposure period ($t_{B2}$) and a second profile for the relationship between the characteristic of said light and said distance.

2. The scanning system according to claim 1, wherein the influenced characteristic of said light is selected from the intensity of the light, its wavelength, and its spectrum.

3. A scanning system according to claim 2, including means for regulating said light source for influencing the intensity of said light radiated onto said object.

4. A scanning system according to claim 3, including a sensor for acquiring the characteristic of said light radiated onto said object.

5. A scanning system according to claim 4, wherein said sensor is a component of the light source and, by means of an output signal from said sensor, control and/or regulation of the current and/or voltage supplied to said light source is effected for the purpose of implementing said specific profile.

6. A scanning system according to claim 1, wherein the means for influencing the light characteristics features variable transparency.

7. A scanning system according to claim 6, wherein said means are in the form of an LCD screen.

8. A scanning system according to claim 6, wherein said means are in the form of two polarization filters adapted for displacement relatively to each other.

9. A scanning system according to claim 5, including means for varying the chromatic spectrum.

10. A scanning system a according to claim 1, including evaluating means for analyzing recorded image data and for producing scanned data, and storage means for said image data and/or said scanned data.

11. A scanning system according to claim 10, wherein test data are stored in said storage means and said evaluating means include comparative means for the purpose of producing and storing correction data and applying said correction data stored in said storage means to said scanned data.

12. A scanning system according to claim 1, wherein focusing for said first and second images can be carried out in different directions.

13. A method for confocal scanning of an object, wherein light is radiated from a light source and focused through imaging optics onto said object to be scanned, and wherein light of an object point backscattered from said object and passing through said imaging optics is recorded by an image detector, wherein the optical distance of the image plane from the imaging optics is varied in a specified manner during an exposure period, the light radiated from said light source onto said object and/or the light reflected from said object and impinging on said sensor during an exposure period ($t_{B1}$) for acquisition of an image is influenced in at least one characteristic, while during an exposure period ($t_{B1}$) a profile stating a specific relationship between the characteristic of said light predetermined as a profile and the optical distance of the image plane from said imaging optics predetermined as a profile is produced, a measured value dependent on said characteristic of said light of the beam path of observation is determined, and a height coordinate ($z_2$) of said object is reconstructed from a comparison of the measured value obtained during said exposure period ($t_{B1}$) with a reference value determined on the basis of a second image obtained during a second exposure period ($t_{B2}$) and a second profile for the characteristics of said light and said distance.

14. A method according to claim 13, wherein the characteristic of said light performs less change during the acquisition of said reference value than when the scan is carried out, and, more particularly, said characteristic of said light is kept constant.

15. A method according to claim 14, wherein, during both exposure periods, the optical path is varied over time in the same way.

16. A method according to claim 15, wherein the second image is generated in a single pass before or after the exposure period ($t_{B1}$) for scanning said object.

17. A method according to claim 16, wherein a sensor registers the characteristic of said light) and the output signal of said sensor is implemented to effect said change in the characteristic of said light.

18. A method according to claim 17, wherein said profile is adapted to changed local conditions when a calibration is carried out.

* * * * *